US010708343B2

(12) United States Patent
Allen et al.

(10) Patent No.: US 10,708,343 B2
(45) Date of Patent: Jul. 7, 2020

(54) DATA REPOSITORY FOR A DISTRIBUTED PROCESSING ENVIRONMENT

(71) Applicant: INTERNATIONAL BUSINESS MACHINES CORPORATION, Armonk, NY (US)

(72) Inventors: Gerald M. Allen, Hursley (GB); Michael D. Brooks, Hursley (GB); Jenny J. He, Hursley (GB); Brad Roeger, Hursley (GB); Philip I. Wakelin, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 202 days.

(21) Appl. No.: 14/963,980

(22) Filed: Dec. 9, 2015

(65) Prior Publication Data

US 2016/0182616 A1    Jun. 23, 2016

(30) Foreign Application Priority Data

Dec. 19, 2014    (GB) .................................. 1422747.4

(51) Int. Cl.
*H04L 29/08*    (2006.01)
*H04L 12/24*    (2006.01)

(52) U.S. Cl.
CPC .......... *H04L 67/10* (2013.01); *H04L 41/5096* (2013.01)

(58) Field of Classification Search
USPC ........................................................ 709/203
See application file for complete search history.

(56) References Cited

U.S. PATENT DOCUMENTS

| 5,109,486 | A | * | 4/1992 | Seymour | G06F 11/3495 |
| | | | | | 709/220 |
| 5,812,784 | A | * | 9/1998 | Watson | H04L 29/06 |
| | | | | | 709/227 |
| 5,875,306 | A | * | 2/1999 | Bereiter | G06F 9/4416 |
| | | | | | 709/220 |
| 6,021,437 | A | | 2/2000 | Chen et al. | |
| 6,505,248 | B1 | | 1/2003 | Casper et al. | |
| 6,799,172 | B2 | | 9/2004 | Candee et al. | |

(Continued)

FOREIGN PATENT DOCUMENTS

JP    2007/025982 A  *  2/2007  ............. G06F 12/00

OTHER PUBLICATIONS

Yu, et al., "Performance Analysis of Affinity Clustering on Transaction Processing Coupling Architecture," IEEE Transactions on Knowledge and Data Engineering, vol. 6, Issue 5, Oct. 1994, pp. 764-786.

*Primary Examiner* — Brian Whipple
*Assistant Examiner* — John Fan
(74) *Attorney, Agent, or Firm* — Steven Chiu, Esq.; Kevin P. Radigan, Esq.; Heslin Rothenberg Farley & Mesiti P.C.

(57) ABSTRACT

A status data repository operable with a distributed processing environment including a plurality of processing regions. The status data repository includes a data storage unit adapted to store status data representative of the availability of the plurality of processing regions. The status data repository is adapted to share stored status data with a client device so as to enable the client device to obtain information regarding the availability of one or more of the plurality of processing regions.

16 Claims, 5 Drawing Sheets

(56) References Cited

U.S. PATENT DOCUMENTS

| | | | |
|---|---|---|---|
| 7,010,576 B2 * | 3/2006 | Bae | G06F 9/50 |
| | | | 709/213 |
| 7,103,650 B1 | 9/2006 | Vetrivelkumaran et al. | |
| 7,844,851 B2 | 11/2010 | Cosmadopoulos et al. | |
| 8,176,495 B2 | 5/2012 | Sen et al. | |
| 8,438,233 B2 * | 5/2013 | Mallet | G06Q 50/01 |
| | | | 709/206 |
| 8,605,132 B1 * | 12/2013 | Swanson | H04N 7/152 |
| | | | 348/14.01 |
| 8,812,586 B1 | 8/2014 | Kulkarni et al. | |
| 2001/0037358 A1 | 11/2001 | Clubb | |
| 2005/0160222 A1 * | 7/2005 | Innan | G06F 3/0605 |
| | | | 711/114 |
| 2009/0044168 A1 * | 2/2009 | Hunter | G06F 8/10 |
| | | | 717/100 |
| 2010/0169284 A1 | 7/2010 | Walter et al. | |
| 2012/0284723 A1 | 11/2012 | Burgess et al. | |

* cited by examiner

DATA REPOSITORY FOR A DISTRIBUTED PROCESSING ENVIRONMENT

PRIOR FOREIGN APPLICATION

This application claims priority from United Kingdom (GB) patent application number 1422747.4, filed Dec. 19, 2014, which is hereby incorporated herein by reference in its entirety.

BACKGROUND

One or more aspects of the invention relate to distributed processing environments, and more particularly, to a distributed processing environment comprising a plurality of processing regions.

It is known to provide a distributed processing environment comprising a plurality of processing regions. Such a distributed processing environment can provide increased availability while the availability of the underlying individual processing regions may change. For example, servers that control a common set of resources can be clustered together and accessed via a single network address, allowing a client to access the resources even when individual servers in the cluster are not available.

If a processing region fails, then any clients that were connected to it can then choose to connect to another processing region of the distributed processing environment to carry out further processing of a transaction for example. However, during a synchronization operation, affinities are created between the components that make up a distributed transaction, and these affinities then have to be maintained or honored following a system or network failure. Affinities thus refer to the processing relationships or requirements that are adhered to (such as a specific order of accessing data or processes for example), and these affinities can restrict the ability to dynamically route work and/or quickly recover from failures.

A client views the distributed processing environment as a single node, and so can only have one connection active at any time, which links the client to one of the processing regions. Thus, when connected to a processing region, a client is unable to re-synchronize outstanding work or transaction with another processing region without dropping the current connection.

Also, a client is unable to discover the availability of a specific processing region unless it tries to connect to it directly. To address this, a client may periodically drop its connection to allow it to attempt to connect back to a specific processing region in the distributed processing environment. However, this approach is not guaranteed to succeed, and the overall performance of a client is adversely affected every time a connection is dropped.

SUMMARY

Shortcomings of the prior art are overcome and additional advantages are provided through the provision of a method of operating a status data repository with a distributed processing environment comprising a plurality of processing regions. The method includes, for instance, storing, in a data storage unit, status data representative of an availability of the plurality of processing regions; and sharing stored status data with a client device to enable the client device to obtain information regarding the availability of one or more of the plurality of processing regions.

Computer program products and computer systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

Embodiments of the invention will now be described, by way of example only, with reference to the accompanying drawings in which.

DETAILED DESCRIPTION

Illustrative embodiments may be utilized in (or in conjunction with) many different types of distributed processing environments. In order to provide a context for the description of elements and functionality of the illustrative embodiments, the figures are provided hereafter as example environments in which aspects of the illustrative embodiments may be implemented. It should therefore be appreciated the figures are only examples and are not intended to assert or imply any limitation with regard to the environments or systems in which aspects or embodiments of the present invention may be implemented.

Embodiments of the present invention are directed toward a concept for maintaining information about the availability of processing regions of a distributed processing environment so that such information may be made available to processing regions and/or client devices. An example of a distributed processing environment may be provided with a cluster of servers that control a common set of resources. Such a cluster of servers may be accessed via a single network address and allow clients access to the resources even when individual servers in the cluster are not available. For example, a cluster of servers can provide distributed transaction processing. In other words, it may provide a distributed multi-server environment for processing a transaction.

Embodiments of the present invention may therefore enable the provision of information about the availability of processing regions in a distributed processing environment that may impact connections, workloads and/or affinities. A client device may use such information to decide how to control a connection with a processing region of the distributed processing environment.

Figure 1:
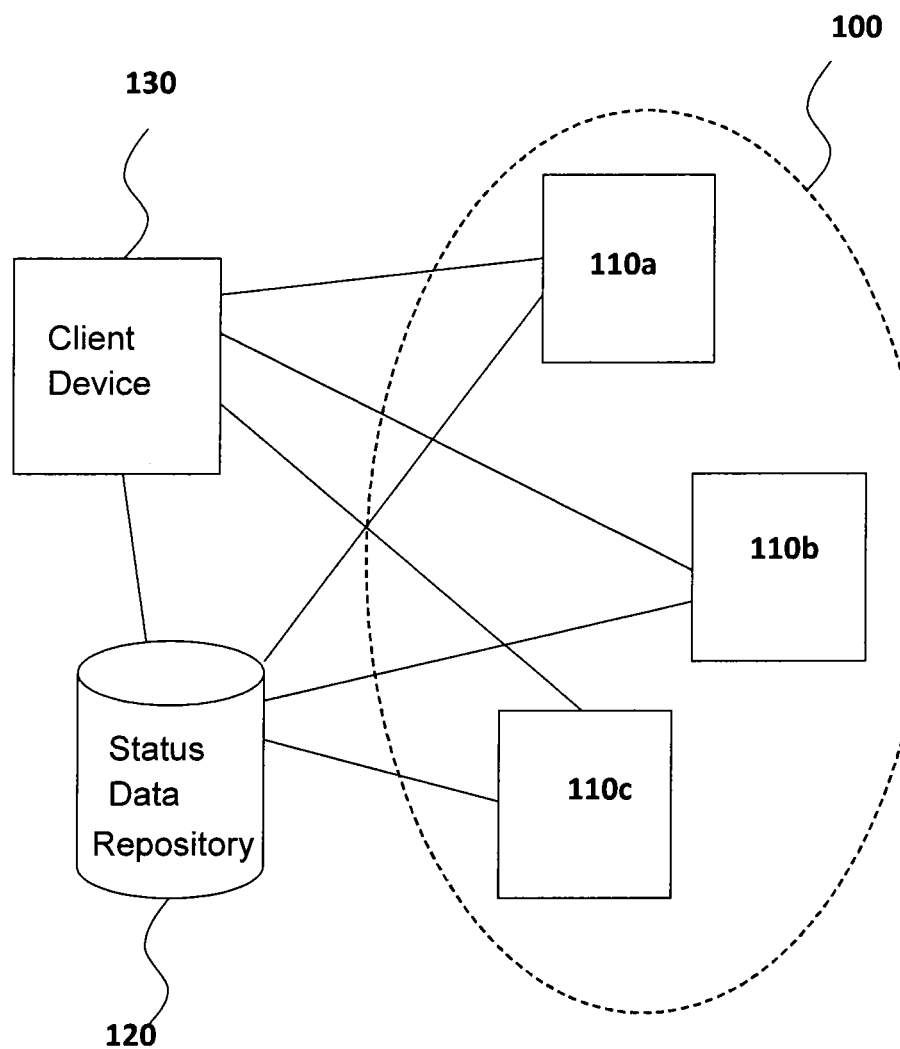
FIG. 1 depicts a schematic block diagram of a distributed processing environment according to an embodiment of the invention.

Referring to FIG. 1, there is depicted a distributed processing environment 100 according to an embodiment of the invention. The distributed processing environment 100 comprises a plurality of processing regions 110 (e.g., 110a, 110b, 110c) and a status data repository 120 according to an embodiment.

Here, each processing region 110 comprises a server 110. The servers control a common set of resources and are virtually clustered together so that they are accessible via a single network address. A client device 130 can therefore access the resources via any of the servers, thus enabling the client device 130 to access the resources even when one of the servers 110 is unavailable. It will therefore be understood that the client device 130 views the virtual cluster of servers as a single network node.

The status data repository 120 is operable with the distributed processing environment 100 and comprises a data storage unit 120 adapted to store status data representative of the availability of the plurality of servers 110. Status data may comprise information indicative of whether a server is at least one of: running; stopped; unavailable; available; inactive, and busy. Stored status data may therefore provide useful information for making decisions about routing workload and/or controlling connections within the distributed processing environment.

In other words, the status data repository 120 is adapted to maintaining information about the availability of server 110 of the distributed processing environment 100.

The status data repository 120 is adapted to share stored status data with the client device 130 so as to enable the client device to obtain information regarding the availability of one or more of the servers 110. For example, the status data repository 120 may be adapted to transmit stored status data to the client device 130 in response to receiving a request from the client device 130. Alternatively, the status data repository 120 may be adapted to be accessed by a client device 130 so that stored status data can be read from the data storage unit 120 by the client device 130.

Information regarding the availability of one or more processing regions may be used, by the client device 130 or access controller for example, to decide how to control a connection with a server 110 of the distributed processing environment 100. The embodiment can therefore enable the client device 130 to obtain information regarding the availability of the servers 110, prior to establishing a connection and/or during an established connection, so that the client device 130 can control (e.g. maintain, modify, stop or reconnect) its connection in accordance with any outstanding affinities it has with one or more of the servers 110.

In this embodiment, the status data repository 120 is adapted to receive, from each of the servers 110, availability information relating to the availability of the respective server 110 and to store status data in its data storage unit 120 based on the availability information received from the server 110. More specifically, the data storage unit 120 is arranged as a shared memory unit adapted to be accessed by the servers 110. The data storage unit 120 therefore provides a centralized data store which is available to all servers 110 of the distributed processing environment 110. The status data repository 120 of this example therefore operates in a 'passive' manner, wherein the servers 110 provide information relating to their status or availability to the repository 120 for storage. Such provision of information to the status data repository may be undertaken periodically, whenever a change in status or availability occurs, or a combination of both. The status data repository 120 therefore provides a simple (e.g., low-complexity) data storage facility for servers 110 of the distributed processing environment 100 to provide (e.g., write to) information regarding their operating status or availability.

The cluster 100 of servers 110 collectively maintains data on current availability of its member servers 110. For example, the servers 110 can collectively maintain a record of the servers 110 running, and those that have failed. Such record(s) are stored in the status data repository 120 and made available to all servers 110 that make up the server cluster 100. The stored status data can then be exposed as a service for a client device to query once they have established a connection with any server region in the cluster.

For example, a client device 130 connected to any server 110 of the cluster 100 can choose to inquire with the status data repository 120 to discover the status of any of servers 110 that it has outstanding affinities with. The client device 130 can then use the status data it obtains from the status data repository to decide if or when it should close its current connection and reconnect to a specific server 110 so that it can resolve some or all of the outstanding affinities.

The client device 130 retains a list of outstanding affinities that it has with specific servers 110 that it has lost contact with. Every time the client device 130 tries to connect to the server cluster 100, it first looks for outstanding affinities and, if found then tries to directly connect back to the server the affinity relates to. If it is unable to do so, the client then connects to another server 110 in the cluster 100, and periodically inquires with the status data repository 120 to determine the status of the server that it still has affinities with. The client device 130 can then identify a suitable point in time for it to release its current connection and re-establish a new one with the server 110 that it has outstanding affinities with.

It is conceivable that a client device 130 may lose contact with more than one server 110 of the cluster 100, leaving sets of affinities with multiple servers 110 that need resolution. The embodiment of FIG. 1 enables a client device 130 to inquire as to the status of multiple servers 110 in the cluster 100, using only a single query. In this way, the client device 130 can resolve multiple sets of affinities one at a time as servers 110 become available.

By way of example, let us now consider a scenario wherein the client device 130 has lost contact with a third server 110c and reconnects to the cluster 100. Further, at the time of losing contact with the third server 110c, the client had no affinities with a first server 110a and had 2 affinities with the third server 110c. Also, the first 110a and second 110b are running (e.g., have the status "running"), whereas the third server 110c is stopped (e.g. has the status "stopped").

The client device 130 was connected to the third sever 110c in the cluster 100 and, at some point, the third server 110c failed leaving two outstanding transactions that could not be fully completed. The client device 130 has knowledge of these affinities with the third server via its affinity records. Records also exist of the affinities that the third server 110c needs to honor, and such records will become available to the third server 110c once it is restarted.

The client device 130 detects that it has lost connectivity with the third server 110c and so it tries to reconnect to it to resolve the outstanding affinities it has with the third server 110c. It is unable to reconnect and so chooses to connect to the cluster 100 of servers so that it can continue to process other transactions. A connection is thus established with the first server 110a.

The client device 130 knows that at some point that the connection with the first server 110a needs to be dropped so that it can reconnect to the third server 110c (to address the outstanding affinities), but does not know when to do so. The client device therefore periodically sends inquires with the status data repository 120 regarding the status of the third server 110c. In this way, the client device 130 is able to determine if or when it should close its current connection with the first server 110a and reconnect to the third server 110c to resolve the outstanding affinities.

It will therefore be appreciated that the embodiment proposes the use of a process in the client device 130 for when the client device 130 connects to the server cluster 100 and knows that it has unresolved affinities with other servers 110. This process periodically builds and sends polling messages (for example, to the status data repository 120) and interprets the responses to them. The process may be customizable, allowing for controls to be applied to when, how often, and how many polling messages are sent. It also determines when the client, having been made aware of the availability of a particular server, decides to close its current connection and connect to the server that it has outstanding affinities with. The process can be further configured to set the priority of affinity resolution against that of how busy the current connection is, allowing for reconnection attempts to be made either immediately, or deferred until the current connection is less busy.

Figure 2:
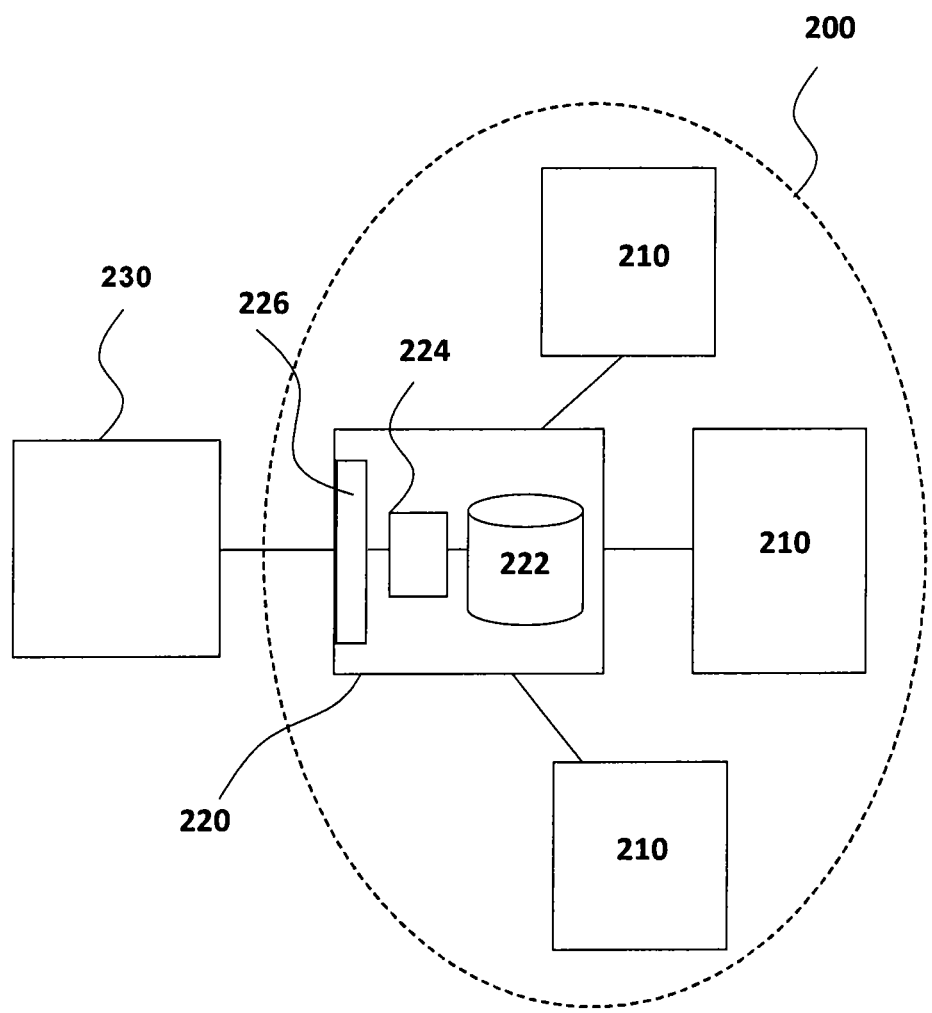
FIG. 2 depicts a schematic block diagram of a distributed processing environment according to another embodiment of the invention.

Referring now to FIG. 2, there is depicted a distributed processing environment 200 according to another embodiment of the invention. The distributed processing environment 200 comprises a plurality of processing regions 210 and a status data repository 220 according to an embodiment.

The processing regions 210 control a common set of resources and are virtually clustered together so that they are accessible via a single address. A client device 230 can therefore access the resources via any of the processing regions 210, thus enabling the client device 230 to access the resources even when one of the processing regions 210 is unavailable. It will therefore be understood that the client device 230 views the virtual cluster of processing regions 210 as a single processing node.

The status data repository 220 is operable with the distributed processing environment 200 and comprises a data storage unit 222 adapted to store status data representative of the availability of the plurality of processing regions 210. Status data may comprise information indicative of whether a server is at least one of: running; stopped; unavailable; available; inactive, and busy. Stored status data may therefore provide useful information for making decisions about routing workload and/or controlling connections within the distributed processing environment.

The status data repository 220 also comprises an inquiry unit 224 adapted to obtain availability information relating to the availability of the plurality of processing regions. Based on availability information obtained by the inquiry unit 224, the status data repository stores status data in the data storage unit 222. Thus, in this embodiment, the status data repository 220 operates in what may be considered to be an 'active' manner wherein the status data repository 220 actively queries (e.g., polls) the processing regions 210 to obtain information relating to their status or availability. Such querying may be undertaken periodically, in reply to a received message/signal (from the client device 230 for example), or may comprise a combination of both.

The status data repository 220 also comprises a service provider 226 adapted to implement a service for providing stored status data (e.g., data stored in the data storage unit 222) in response to a query from the client device 230. The service provider 226 is therefore adapted to expose stored status data as a service for the client device 230 to query.

In other words, the status data repository 220 is adapted to maintain and share information about the availability of the processing regions 210 of the distributed processing environment 200.

In this embodiment, the status data repository 220 is adapted to obtain, from each of the processing regions 210, availability information relating to the availability of the respective processing regions 210 and to store status data in its data storage unit 220 based on the availability information obtained. More specifically, the status data repository 220 is arranged as a central unit adapted to access the processing region 210. The status data repository 220 therefore provides a centralized data store which is made available to the client device via a service provider 226.

The status data repository 220 maintains data on current availability of the processing regions 210. For example, the status data repository 220 can maintain a record of the processing regions 210 which are running, and those that have failed. Such record(s) are stored in the data storage unit 222 and made available to a client device 230 via the service provider 226.

In this example, the client device 230 comprises an affinity storage unit 232 adapted to store affinity data representative of one or more outstanding affinities. Using the affinity storage unit 232, the client device 230 retains a list of outstanding affinities that it has with specific processing regions 210.

The client device 230 also comprises a status query unit 234 adapted to obtain availability information regarding the availability of one or more of the plurality of processing regions. The status query unit 234 inquires with the service provider 226 of the status data repository 220 to discover the status of the processing regions 210 that it has outstanding affinities with. The client device 230 can then use the status data it obtains from the service provider 226 to decide if or when it should close its current connection and reconnect to a specific processing region 210 so that it can resolve some or all of the outstanding affinities. For this purpose, the client device 230 comprises a controller unit 236 which is adapted to control a connection between the client device and a processing region 210 based on stored affinity data and availability information obtained by the status query unit 234.

Thus, it will be understood that the client device 230 is adapted to inquire (with the status data repository 220) as to the availability of one or more processing regions 210 of the distributed processing environment 200, and this may be done before establishing a connection and/or during an established connection. The client device 230 can therefore control a single connection in accordance with any outstanding affinities (recorded in the affinity storage unit 232) without necessarily needing to terminate an existing connection. The client may also be able to modify an existing connection at an appropriate time which takes into the availability of a processing region.

Figure 3:
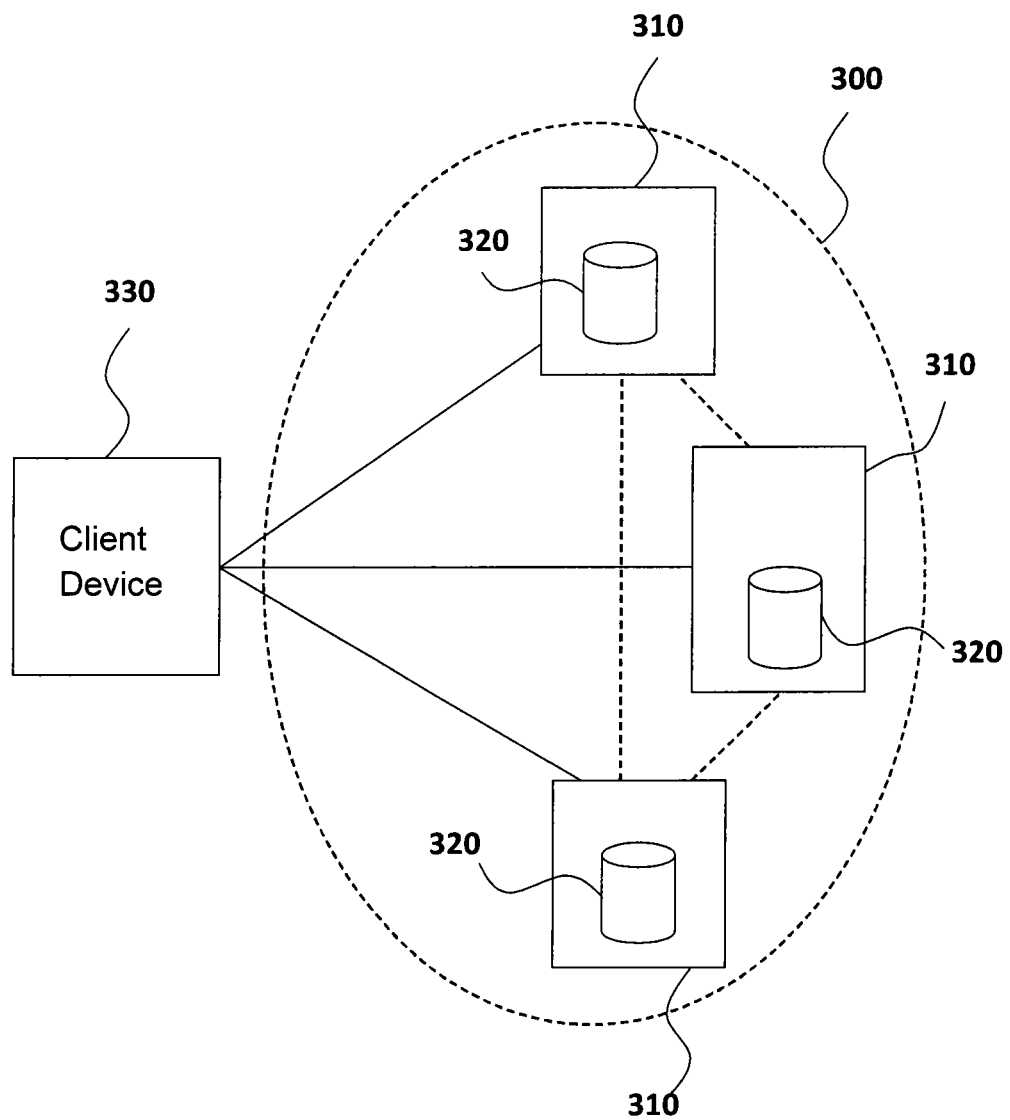
FIG. 3 depicts a schematic block diagram of a distributed processing environment according to yet another embodiment of the invention.

Referring now to FIG. 3, there is depicted a distributed processing environment 300 according to yet another embodiment of the invention. The distributed processing environment 300 comprises a plurality of processing regions 310 which are adapted to control a common set of resources and clustered together so that they are accessible via a single address. Each of the processing regions 310 comprises a memory unit 320 adapted to store status data representative of the availability of the plurality of processing regions 310. The processing regions 310 are adapted to cooperatively maintain status data stored in their memory units 320 such that they collectively provide a status data repository. Each processing region 310 thus implements its own status data repository 320, and the processing regions 310 cooperate so as to maintain (e.g., update) the status data repository 320 of each processing region. By way of example, this may be done by broadcasting information to the processing regions 310 when there is a change in operating status or availability.

The embodiment of FIG. 3 therefore comprises multiple instances of a status data repository 320, which provides for improved accessibility of status data.

Each memory unit 320 (i.e., each status data repository instance) maintains status data relating to the current availability of the processing regions 310. The stored status data can then be accessed by a client device 330. For example, a client device 330 connected to any processing region 310 can inspect stored status data in the memory unit 320 of the processing region 310 to discover the status of processing regions 310 that it has outstanding affinities with. The client device 330 can then use the status data to decide if or when it should close its current connection and reconnect to another processing region 310 to resolve one or more outstanding affinities.

Other concepts or approaches may be used to provide the client device 330 with status data relating to the current availability of the processing regions 310. For example, the processing regions 310 may execute a process in response to receiving a message or request from the client device 330. The process can be adapted to interpret the message/request, use the interpretation result(s) to retrieve the appropriate stored status data, and then return the results (e.g., status data) to the client device 330.

Figure 4:
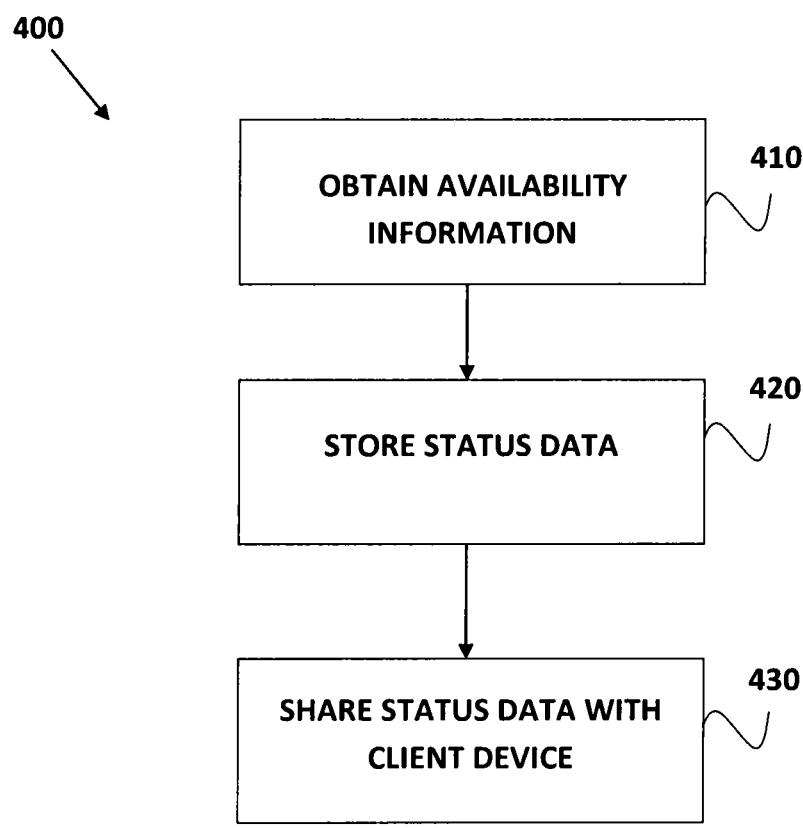
FIG. 4 depicts a flow diagram of a method for operating a status data repository with a distributed processing environment comprising a plurality of processing regions according to an embodiment.

Referring now to FIG. 4, there is depicted a flow diagram of a method 400 for operating a status data repository with a distributed processing environment according to an embodiment, wherein the distributed processing environment comprises a plurality of processing regions.

The method 400 begins in step 410 wherein the status data repository is controlled to obtain availability information relating to the availability of the plurality of processing regions. Here, the status data repository is controlled to receive the availability data from the processing regions. However, in an alternative embodiment, the status data repository may be adapted to actively retrieve availability data from the processing regions, for example by polling or surveying the processing regions.

Next, in step 420, the status data repository is controlled to store status data representative of the availability of the plurality of processing regions. The stored status data is based on the availability information obtained in step 410.

Finally, in step 430, the status data repository is operated to share stored status data with a client device so as to enable the client device to obtain information regarding the availability of one or more of the plurality of processing regions. This may be done, for example, controlling the status data repository to implement a service which responds to requests received from the client device.

Figure 5:
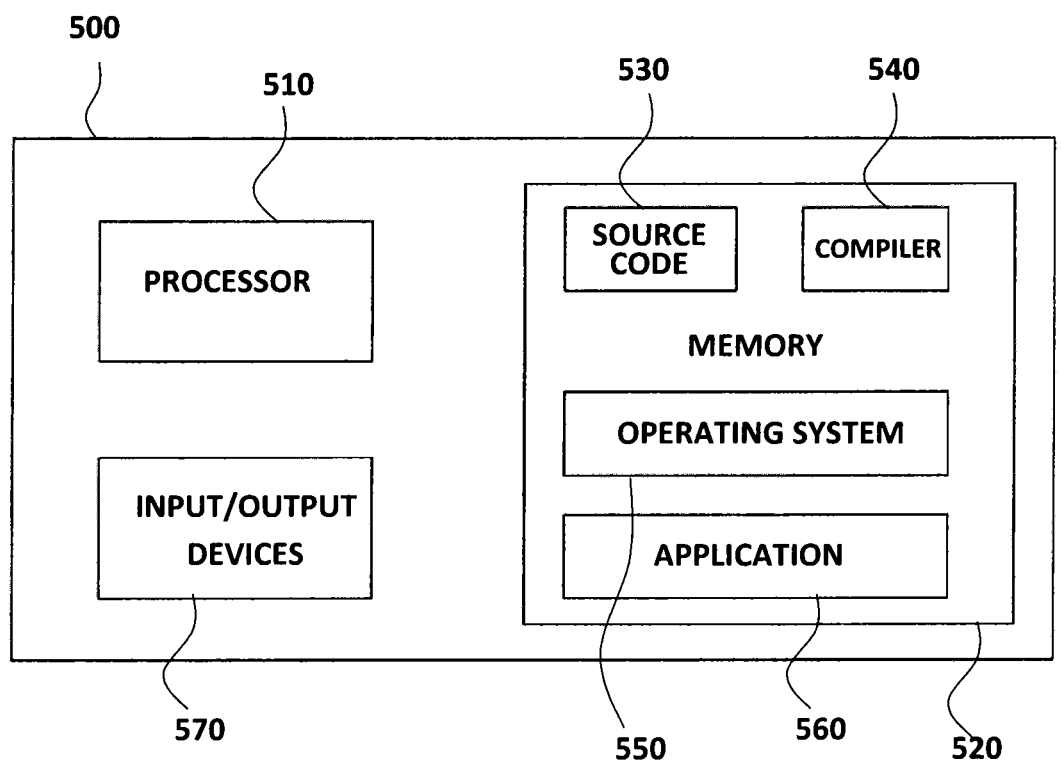
FIG. 5 illustrates an example of a computer in which an embodiment may be employed.

FIG. 5 illustrates an example of a computer 500 in which status data repository may be employed. Various operations discussed above may utilize the capabilities of the computer 500. A status data repository may be incorporated in any element, module, application, and/or component discussed herein, such as input and/or output (I/O) devices 570.

The computer 500 includes, but is not limited to, PCs, workstations, laptops, PDAs, palm devices, servers, storages, and the like. Generally, in terms of hardware architecture, the computer 500 may include one or more processors 510, memory 520, and one or more I/O devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a digital signal processor (DSP), or an auxiliary processor among several processors associated with the computer 500, and the processor 510 may be a semiconductor based microprocessor (in the form of a microchip) or a microprocessor.

The memory 520 can include any one or a combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the memory 520 may include one or more separate programs, each of which comprises an ordered listing of executable instructions for implementing logical functions. The software in the memory 520 includes a suitable operating system (O/S) 550, compiler 540, source code 530, and one or more applications 560 in accordance with example embodiments. As illustrated, the application 560 comprises numerous functional components for implementing the features and operations of the example embodiments. The application 560 of the computer 500 may represent various applications, computational units, logic, functional units, processes, operations, virtual entities, and/or modules in accordance with example embodiments, but the application 560 is not meant to be a limitation.

The operating system 550 controls the execution of other computer programs, and provides scheduling, input-output control, file and data management, memory management, and communication control and related services. It is contemplated that the application 560 for implementing example embodiments may be applicable on all commercially available operating systems.

Application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the 0/S 550. Furthermore, the application 560 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 570 may include input devices such as, for example but not limited to, a mouse, keyboard, scanner, microphone, camera, etc. Furthermore, the I/O devices 570 may also include output devices, for example but not limited to, a printer, display, etc. Finally, the I/O devices 570 may further include devices that communicate both as inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or intranet.

If the computer 500 is a PC, workstation, intelligent device or the like, the software in the memory 520 may further include a basic input output system (BIOS) (omitted for simplicity). The BIOS is a set of software routines that initializes and tests hardware at startup, starts the O/S 550, and supports the transfer of data among the hardware devices. The BIOS is stored in some type of read-only-memory, such as ROM, PROM, EPROM, EEPROM or the like, so that the BIOS can be executed when the computer 500 is activated.

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software it should be noted that the application 560 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 560 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

As described herein, according to an aspect of the invention, there is provided a status data repository operable with a distributed processing environment comprising a plurality of processing regions, wherein the status data repository comprises: a data storage unit adapted to store status data representative of the availability of the plurality of processing regions, and wherein the status data repository is adapted to share stored status data with a client device so as to enable the client device to obtain information regarding the availability of one or more of the plurality of processing regions.

Thus, there is provided a concept for maintaining information about the availability of processing regions of a distributed processing environment. This information may be stored in a repository and made available to processing regions and/or client devices. Such information regarding the availability of one or more processing regions may be used, by a client device for example, to decide how to control a connection with a processing region of the distributed processing environment.

Put another way, there is proposed a data repository operable to store data indicative of the operating status or availability of processing regions in a distributed processing environment.

Embodiments may thus relate to the control of distributed workloads in distributed processing environments, and more particularly to the provision of information about the availability of processing regions in a distributed processing environment that may impact connections, workloads and/or affinities.

The status data repository may be adapted to receive, from a processing region, availability information relating to the availability of the processing region, and to store status data in the data storage unit based on the availability information received from the processing region. Embodiments of the repository may therefore operate in what may be considered to be a 'passive' manner wherein the processing regions provide information relating to their status or availability to the repository for storage. This may be undertaken periodically, whenever a change in status or availability occurs, or may comprise a combination of both. Embodiments of the status data repository may thus provide a simplified (e.g., low-complexity) storage facility for processing regions of a distributed processing environment to provide (e.g., write to a data store) information to regarding their operating status or availability.

In an embodiment, the status data repository may further comprise an inquiry unit adapted to obtain availability information relating to the availability of the plurality of processing regions, and the status data repository may be adapted to store status data in the data storage unit based on availability information obtained by the inquiry unit. Thus, some embodiments of the repository may operate in what may be considered to be an 'active' manner wherein the repository actively queries (e.g., polls) processing regions to obtain information relating to their status or availability. This may be undertaken periodically, in reply to a received message/signal (from a client device for example), or may comprise a combination of both.

Status data may comprise information indicative of whether a processing region is at least one of: running; stopped; unavailable; available; inactive, and busy. Status data may therefore provide useful information for making decisions about routing workload and/or controlling connections within the distributed processing environment.

In an embodiment, the status data repository may further comprise a service provider adapted to implement a service for providing stored status data in response to a query from the client device. Put another way, status data may be exposed as a service for a client to query.

The distributed processing environment may comprise a cluster of servers, wherein each of the plurality of processing regions comprises at least one of the servers. The cluster of servers may therefore cooperate to control a set of resources accessible to a client device via a single address associated with the cluster of servers. In such an embodiment, a client may view the server cluster as a single node and thus only be able to have one active connection (to a server) at any particular time. The embodiment, however, may enable the client to obtain (e.g., query) information about the availability of the servers, prior to establishing a connection and/or during an established connection, so that it can control (e.g., maintain, modify, stop or reconnect) its connection in accordance with any outstanding affinities with one or more of the servers.

According to an aspect of the invention, there is provided a distributed processing environment comprising a plurality of processing regions and a status data repository according to an embodiment. Embodiments of the proposed status data repository may thus be employed in conjunction with a distributed processing environment so as to provide new and/or improved functionality.

Each of the plurality of processing regions may comprise a memory unit adapted to store status data representative of the availability of the plurality of processing regions, and the plurality of processing regions may be adapted to collectively maintain status data stored in the plurality of memory units, such that the status data repository comprises the plurality of memory units. Each processing region may therefore implement its own status data repository, and the processing regions may cooperate so as to maintain (e.g., update) the status data repository of each processing region, for example by broadcasting information to the processing regions when there is a change in operating status or availability. Such multiple instances of the status data repository may provide for improved accessibility of status data.

In another embodiment, the status data repository may comprise a shared memory unit adapted to be accessed by the plurality of processing regions. A centralized data store may therefore be used to implement the status data repository which is available to all processing regions of the distributed processing environment. Such a central data store may be provided with information from individual processing regions when there is a change in their operating status or availability.

According to another aspect of the invention, there is provided a client device operable with a status data repository according to an embodiment and a distributed processing environment comprising a plurality of processing regions, wherein the client device comprises: an affinity storage unit adapted to store affinity data representative of one or more outstanding affinities; a status query unit adapted to obtain availability information regarding the availability of one or more of the plurality of processing regions; and a controller unit adapted to control a connection between the client device and a processing region based on stored affinity data and availability information obtained by the status query unit.

Thus, there is proposed a concept of a client inquiring as to the availability of a processing region of a distributed processing environment, and this may be undertaken before establishing a connection and/or during an established connection. A client may therefore control a single connection in accordance with any outstanding affinities without necessarily needing to terminate an existing connection, for example. The client may also be able to modify an existing connection at an appropriate time which takes into consideration the availability of a processing region. Embodiments may therefore relate to the control of connections within a distributed processing environment.

According to yet another aspect of the invention, there is provided a method for operating a status data repository with a distributed processing environment comprising a plurality of processing regions, the method comprising: storing, in a data storage unit, status data representative of the availability of the plurality of processing regions, and sharing stored status data with a client device so as to enable the client device to obtain information regarding the availability of one or more of the plurality of processing regions.

An embodiment may further comprise receiving, from a processing region, availability information relating to the availability of the processing region. The step of storing status data may then comprise storing status data in the data storage unit based on the received availability information.

In an embodiment, the method may also comprise operating an inquiry unit to obtain availability information relating to the availability of the plurality of processing regions. The storing status data may thus further comprise storing status data in the data storage unit based on the availability information obtained by the inquiry unit.

The sharing stored status data may comprise implementing a service by a service provider.

In an embodiment, a computer system may be provided which comprises: a computer program product according to an embodiment; and one or more processors adapted to perform a method according to an embodiment by execution of the computer-readable program code of said computer program product.

A further aspect of the invention relates to a computer-readable non-transitory storage medium comprising instructions which, when executed by a processing device, execute the method for operating a status data repository with a distributed processing environment comprising a plurality of processing regions according to an embodiment.

These and other embodiments, along with many of its advantages and features, are described in more detail in conjunction with the text below and the attached figures.

Aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description has been presented for purposes of illustration and description, and is not intended to be exhaustive or limited to aspects of the invention in the form disclosed. Many modifications and variations will be apparent to those of ordinary skill in the art. Embodiments have been chosen and described in order to best explain principles of proposed embodiments, practical application(s), and to enable others of ordinary skill in the art to understand various embodiments with various modifications are contemplated.

What is claimed is:

1. A computer-implemented method of facilitating processing in a computing environment, said computer-implemented method comprising:

establishing a connection, by a client device, to a server of a plurality of servers of a distributed processing environment;

maintaining, by the client device, an affinity data structure identifying one or more outstanding affinities that the client device has with one or more specific servers of the plurality of servers with which the client device has lost contact, wherein the one or more outstanding affinities were created during a synchronization operation;

based on the client device determining, with reference to the affinity data structure, that there are one or more outstanding affinities with the one or more specific servers of the plurality of servers, and while connected to the server of the plurality of servers of the distributed processing system, the client device inquiring of a shared repository separate from the client device, and coupled to the distributed processing environment, as to status of the one or more specific servers that the client device lost contact with, and with which the client device has one or more outstanding affinities;

based on the inquiring, obtaining, by the client device, information stored at the shared repository, the information comprising availability information of the one or more specific servers, wherein the availability information is indicative of a status of the one or more specific servers of the plurality of servers indicating that another server of the one or more specific servers is currently available;

determining, by the client device, to release connection to the server and reconnect with the another server of the one or more specific servers of the plurality of servers, the determining using the availability information; and controlling, by the client device, release of the connection with the server and reconnection with the specific server of the one or more specific servers to resolve, at least in part, the one or more affinities, the controlling being based on the determining, and wherein the one or more affinities include one or more processing relationships between the client device and the one or more specific servers that the client device has lost contact with.

2. The computer-implemented method of claim 1, wherein the shared repository is updated based on receiving availability information from the one or more specific servers of the plurality of servers.

3. The computer-implemented method of claim 1, wherein the inquiring comprises sending polling messages to the shared repository, the sending being controlled by one or more configurable controls.

4. The computer-implemented method of claim 3, wherein based on receiving a query from the client device, a service provides the availability information to the shared repository.

5. The computer-implemented method of claim 1, wherein the availability information for the specific server of the one or more specific servers of the plurality of servers comprises information indicative of whether the specific server is at least one of: running or available.

6. The computer-implemented method of claim 1, wherein the distributed processing environment comprises a cluster of servers, and wherein the cluster of servers cooperate to control a set of resources accessible to the client device via a single connection address associated with the cluster of servers.

7. A computer program product for facilitating processing in a computing environment, the computer program product comprising:
   a non-transitory computer readable storage medium readable by a processing circuit and storing instructions for execution by the processing circuit for performing a method comprising:
      establishing a connection, by a client device, to a server of a plurality of servers of a distributed processing environment;
      maintaining, by the client device, an affinity data structure identifying one or more outstanding affinities that the client device has with one or more specific servers of the plurality of servers with which the client device has lost contact, wherein the one or more outstanding affinities were created during a synchronization operation;
      based on the client device determining, with reference to the affinity data structure, that there are one or more outstanding affinities with the one or more specific servers of the plurality of servers, and while connected to the server of the plurality of servers of the distributed processing system, the client device inquiring of a shared repository separate from the client device, and coupled to the distributed processing environment, as to status of the one or more specific servers that the client device lost contact with, and with which the client device has one or more outstanding affinities;
      based on the inquiring, obtaining, by the client device, information stored at the shared repository, the information comprising availability information of the one or more specific servers, wherein the availability information is indicative of a status of the one or more specific servers of the plurality of servers indicating that another server of the one or more specific servers is currently available;
      determining, by the client device, to release connection to the server and reconnect with the another server of the one or more specific servers of the plurality of servers, the determining using the availability information; and
      controlling, by the client device, release of the connection with the server and reconnection with the specific server of the one or more specific servers to resolve, at least in part, the one or more affinities, the controlling being based on the determining, and wherein the one or more affinities include one or more processing relationships between the client device and the one or more specific servers that the client device has lost contact with.

8. The computer program product of claim 7, wherein the shared repository is updated based on receiving availability information from the one or more specific servers of the plurality of servers.

9. The computer program product of claim 7, wherein the inquiring comprises sending polling messages to the shared repository, the sending being controlled by one or more configurable controls.

10. The computer program product of claim 9, wherein based on receiving a query from the client device, a service provides the availability information to the shared repository.

11. The computer program product of claim 7, wherein the availability information for the specific server of the one or more specific severs of the plurality of servers comprises information indicative of whether the specific server is at least one of: running or available.

12. The computer program product of claim 7, wherein the distributed processing environment comprises a cluster of servers, and wherein the cluster of servers cooperate to control a set of resources accessible to the client device via a single connection address associated with the cluster of servers.

13. A computer system for facilitating processing in a computing environment, the computer system comprising:
   a data storage unit including a shared repository coupled to a distributed processing environment; and
   a client device in communication with the data storage unit, wherein the computer system is configured to perform a method, said method comprising:
      establishing a connection, by a client device, to a server of a plurality of servers of a distributed processing environment;
      maintaining, by the client device, an affinity data structure identifying one or more outstanding affinities that the client device has with one or more specific servers of the plurality of servers with which the client device has lost contact, wherein the one or more outstanding affinities were created during a synchronization operation;
      based on the client device determining, with reference to the affinity data structure, that there are one or more outstanding affinities with the one or more specific servers of the plurality of servers, and while connected to the server of the plurality of servers of the distributed processing system, the client device inquiring of a shared repository separate from the client device, and coupled to the distributed processing environment, as to status of the one or more specific servers that the client device lost contact with, and with which the client device has one or more outstanding affinities;

based on the inquiring, obtaining, by the client device, information stored at the shared repository, the information comprising availability information of the one or more specific servers, wherein the availability information is indicative of a status of the one or more specific servers of the plurality of servers indicating that another server of the one or more specific servers is currently available;

determining, by the client device, to release connection to the server and reconnect with the another server of the one or more specific servers of the plurality of servers, the determining using the availability information; and controlling, by the client device, release of the connection with the server and reconnection with the specific server of the one or more specific servers to resolve, at least in part, the one or more affinities, the controlling being based on the determining, and wherein the one or more affinities include one or more processing relationships between the client device and the one or more specific servers that the client device has lost contact with.

14. The computer system of claim 13, wherein the inquiring comprises sending polling messages to the shared repository, the sending being controlled by one or more configurable controls.

15. The computer system of claim 13, wherein the availability information for the specific server of the one or more specific servers of the plurality of servers comprises information indicative of whether the specific server is at least one of: running or available.

16. The computer system of claim 13, wherein the distributed processing environment comprises a cluster of servers, and wherein the cluster of servers cooperate to control a set of resources accessible to the client device via a single connection address associated with the cluster of servers.

* * * * *